B. E. J. EILS.
Improvement in Harvester-Pitman.
No. 131,671. Patented Sep. 24, 1872.
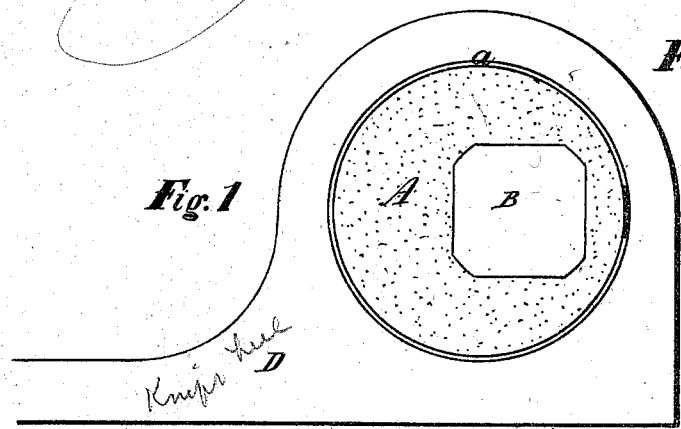
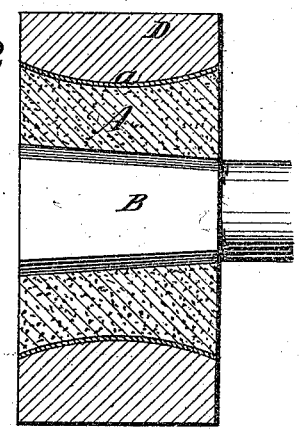
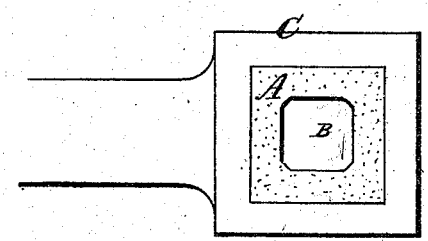
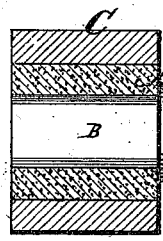
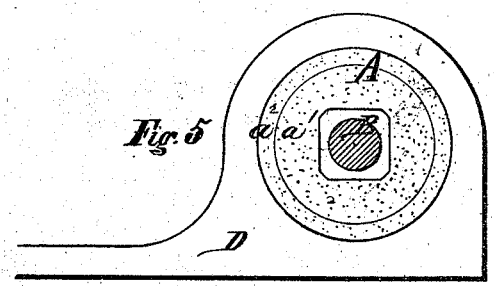
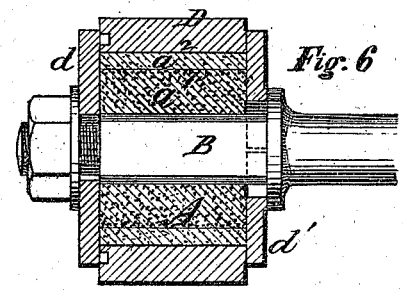
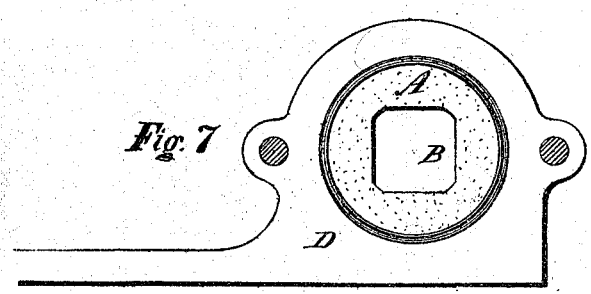
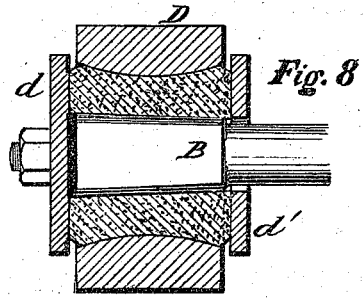
Attest
A. Ruppert.
W. Bradford.
Inventor
B. Edw. J. Eils.

UNITED STATES PATENT OFFICE.

B. EDWARD J. EILS, OF WASHINGTON, DISTRICT OF COLUMBIA.

IMPROVEMENT IN HARVESTER-PITMEN.

Specification forming part of Letters Patent No. 131,671, dated September 24, 1872.

*To all whom it may concern:*

Be it known that I, B. EDWARD J. EILS, residing at Washington, in the District of Columbia, have invented a certain Improvement in Harvester-Pitmen, of which the following is a specification:

The principal object of this invention is to provide, as a connection between a pitman and a reciprocating device, a frictionless joint, for the purpose of preventing the usual wear and consequent abnormal lost motion, which, always objectionable, are particularly so in the joint between the pitman and the cutter-bar of a harvester, for which the invention is more especially designed, although its peculiar quality will at once suggest the desirableness of its application to reciprocating sawing-machines and many other machines in which a pitman or connecting-rod is used, as part of a mechanism for converting rotary into reciprocating motion, or vice versa.

In the conception of the first part of my invention due advantage was taken of the fact that there always is but a limited oscillatory motion in the joint between a pitman and a reciprocating device. To take up these slight oscillations and still avoid a moving of surfaces upon each other in the joint, I provide it with an elastic medium which is firmly connected with or fastened to the pitman, and so attached to the reciprocating device that the said oscillations will result merely in a slight twisting of the elastic medium. This principle may take embodiment in a variety of forms. Every one of the joints which I have selected as illustrations is composed of a rigid pitman-wrist and an elastic socket, which is made fast upon said wrist and suitably connected, though not necessarily fixed, to the reciprocating device. The second part of my invention consists in such an adaptation of the above-described torsional joint to harvesters as to permit the usual folding of the cutting apparatus, as well as the motions of the latter in following the surface inequalities, should the flexibility of the elastic medium at any time prove insufficient for the latter purpose, as is possible where such elastic medium is of uniform stiffness throughout.

Figures 1 and 2 illustrate a very simple form of my invention, suitable for harvester-pitmen. Figs. 3 and 4 are delineations of the simplest structure of my invention. Figs. 5 and 6 and 7 and 8 represent modifications of the joint shown in the first two figures.

The same letters of reference are employed in the different figures to designate identical parts.

In the different examples illustrated in the annexed drawing the essential parts of the joint consist of an elastic socket, A, which is preferably made of a good quality of India-rubber, and is inserted or formed in the heel or knuckle of the reciprocating device, and a rigid stud or wrist, B, which is immovably fixed to the pitman and also firmly secured to the elastic socket. As shown in Figs. 3 and 4, the socket is sprung over an angular and tapering pitman-wrist, and likewise sprung into an angular and flaring aperture in the end C of a reciprocating device. This method of connecting the parts, which is also adopted in the joints shown respectively in Figs. 1 and 2 and 7 and 8, is very simple and convenient, and will ordinarily be quite sufficient to prevent accidental disconnection or disarrangement thereof, but the parts may be connected together in any other preferred manner, provided the principal conditions first stated are complied with. Such a torsional joint, while it answers every purpose where the reciprocating device moves in fixed guides, requires to be somewhat modified in construction to adapt it for use on harvester-pitmen, in order to permit the folding of the cutting apparatus. One form of joint for this purpose is illustrated in Figs. 1 and 2, and is composed of a cylindrical or circular socket, inserted in a corresponding aperture in the knife-heel D, and an angular pitman-wrist, which is fastened in an eccentric eye in the elastic socket. The cutter-bar may now be turned on the socket, but the oscillations of the pitman will, as heretofore, only result in a slight twisting of the latter. In case the elastic socket is sprung into the knife-heel, as here shown, a thin split ring, $a$, may intervene between the two to reduce the friction. An inferior modification of this joint is shown in Figs. 7 and 8, in which the pitman-wrist is fastened in a concentric eye of the elastic socket, and the friction between the knife-heel and the socket relied upon for preventing any motion of the latter, cheek-plates $d$ and $d'$ being also employed to press against the ends of the socket, and thus aid in preventing any oscillation thereof.

Another form of joint adapted to harvester-pitmen is illustrated in Figs. 5 and 6, in which the elastic socket is composed of an interior portion, $a^1$, of stiff and an exterior portion, $a^2$, of more flexible India-rubber. The two portions of the socket are vulcanized together, and the socket itself is likewise vulcanized to the knife-heel. The pitman-wrist is, as usual, fastened to the elastic socket, which takes up the oscillations, and also, by reason of the flexibility of its outer ring $a^2$, permits the folding of the cutter-bar. Here cheek-plates are also employed to prevent the spreading of the elastic socket. It may be found desirable to use such plates in every instance. The socket or elastic medium should be made of as stiff rubber as the nature of the case will admit of, in order to cause as little yield to the thrusts of the pitman as possible.

When ready detachability of the pitman and the reciprocating device from each other is desirable, as in harvesters, it may be provided for at the junction of the wrist and and the pitman, or in various other ways.

It will be understood that the elastic medium may take other forms than that of a socket or sleeve and be applied in many different ways without departing from the principle of my invention as above stated.

What I claim as my invention, and desire to secure by Letters Patent, is—

1. A frictionless joint between a pitman and a reciprocating device, embodying in its construction an elastic medium, which, with its torsion alone, takes up the oscillations of the pitman, as described.

2. A harvester cutter-bar and pitman connected together by such a torsional joint, constructed to permit the folding of the cutting apparatus.

3. A harvester cutter-bar and pitman connected together by an elastic socket fitting a circular aperture in the knife-heel and a rigid wrist fast in an eccentric eye in the elastic socket.

In testimony whereof I have signed my name to this specification in the presence of two subscribing witnesses.

B. EDW. J. EILS.

Witnesses:
A. RUPPERT,
W. BRADFORD.